United States Patent [19]

Miller

[11] 4,006,541
[45] Feb. 8, 1977

[54] TACTILE LEARNING DEVICE

[76] Inventor: Richard Lee Miller, Box 485, Lindsborg, Kans. 67456

[22] Filed: Dec. 9, 1975

[21] Appl. No.: 639,206

[52] U.S. Cl. .................. 35/35 H; 35/8 A; 35/35 J
[51] Int. Cl.$^2$ .......................... G09B 1/10
[58] Field of Search ............ 35/35 R, 35 P, 35 H, 35/35 J, 35 C, 36, 37, 8 A, 73, 69, 70, 71

[56] References Cited
UNITED STATES PATENTS

| 778,110 | 12/1904 | Cannon | 35/35 J X |
|---|---|---|---|
| 2,474,447 | 6/1949 | Wheelock | 35/35 H |
| 3,170,247 | 2/1965 | Kovacevich | 35/35 J |
| 3,520,072 | 7/1970 | Greenwood | 35/35 H |
| 3,593,433 | 7/1971 | Dillon et al. | 35/35 R |

FOREIGN PATENTS OR APPLICATIONS 139,243  3/1903  Germany .................. 35/36

Primary Examiner—William H. Grieb
Attorney, Agent, or Firm—Marden S. Gordon

[57] ABSTRACT

A training aid for young children, particularly for the retarded, to assist young children in the more rapid learning of primary subjects, such as printing, writing, and arithmetic, the device consisting of a series of cards with raised or embossed imprints, a storage and carrying case for said cards, a series of rounded pegs affixed to the lid of the carrying case for placement of the cards provided with matching holes thereon, the cards also being provided in a series of subtle and contrasting colors, a series of stimulus and answer cards, and an accompanying instructional tape cassette for progressive guidance of the student in learning.

1 Claim, 4 Drawing Figures

U.S. Patent  Feb. 8, 1977  4,006,541
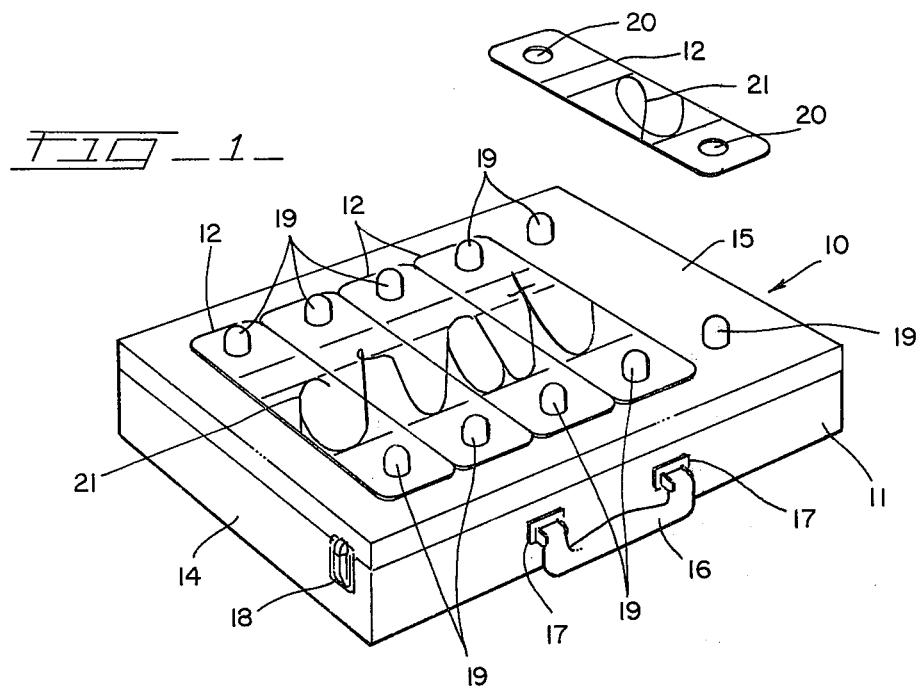
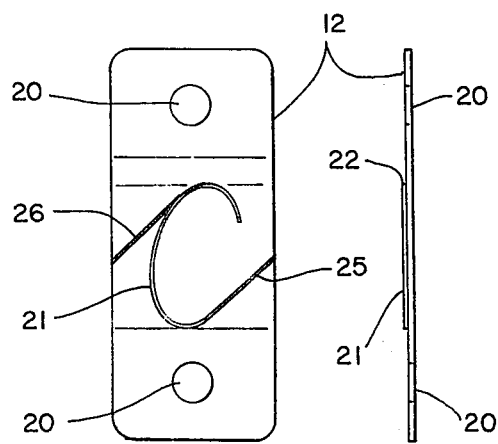
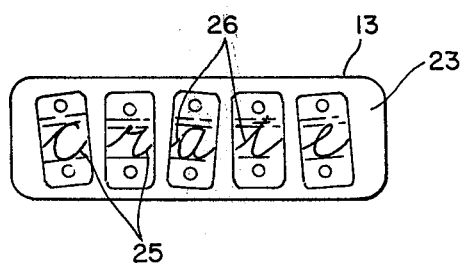
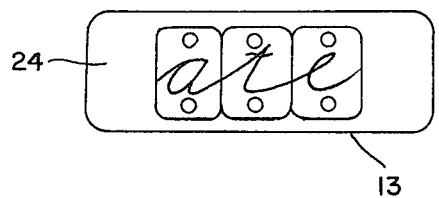

4,006,541

TACTILE LEARNING DEVICE

BACKGROUND OF THE INVENTION

1. Field of the Invention

This invention relates to a training aid for young children, particularly for retarded children, to more effectively learn primary skills, such as printing, writing, and arithmetic.

2. Description of the Prior Art

There has been considerable study and research conducted in the educational field to enhance the learning skills of young children, particularly those who are retarded or who are superior in their learning skills. As a result, many learning aids have been developed for such children and these aids include the use of lettered and numbered cards, including multiple colored arrangements, but concentration in the field has been with emphasis on the use of visual skills primarily. In other words, young children are typically taught primary skills by the employment of visual aids, but without emphasis on combining visual skills with the sense of touch. Except for teaching blind people to read by the sense of touch in the braille system, the closest method currently utilized for retarded or advanced children is to trace letters, numbers, or pictures with the aid of writing instruments, such as pencils and the like.

SUMMARY OF THE INVENTION

The present invention provides a novel tactile learning device for teaching young children, particularly retarded children, the primary skills of printing, writing, and arithmetic by means of effective utilization of visual and tactile senses, thereby increasing the rate of learning and enforcing the receptive capability of the student.

It is a feature of the present invention to provide a combination visual and tactile learning device.

A further feature of the present invention provides a tactile learning device which is easy to use and is stimulating to the learner.

Yet still a further feature of the present invention provides a tactile learning device accompanied by an instructional tape cassette to provide audio assistance, thereby minimizing the need for personal attention by a teacher.

Other features of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the carrying case with lettered cards positioned to pegs on the lid of the carrying case; and FIG. 2 is a perspective view of a lettered card; and FIG. 3 is a perspective view of the front side of a stimulus card; and FIG. 4 is a perspective view of the reverse side or answer side of the stimulus card.

DESCRIPTION OF THE PREFERRED EMBODIMENT

Referring now to the drawings in detail, there is illustrated a preferred form of the tactile learning device constructed in accordance with the principles of the present invention and which is designated generally in its entirety by the reference 10 and which is comprised of a storage and carrying case 11, a series of learning cards 12, and a series of stimulus cards 13, an instructional tape cassette which is not shown due to its conventional nature and being long established in the educational field, and associated components as will be later described.

The storage and carrying case 11 is a conventional type case constructed of conventional materials, such as wood or plastic with an optional covering material, such as vinyl or leather, consisting of a bottom compartment 14, a lid 15, a handle 16 attached to the bottom compartment 14 by means of conventional brackets or hinges 17, one or more locking mechanisms 18, and a series of internal compartments for the purpose of storing the learning cards 12 and stimulus cards 13, the compartments not being shown due to their conventional features, and a series of rounded pegs 19 being affixed and protruding from the top of the lid 15 equally spaced along and near the top and the bottom of the lid 15 so as to form two rows of parallel pegs. The rounded pegs 19 are constructed of wood or plastic and are securely attached to the top of the lid 15, with the pegs being of a suggested diameter of approximately one inch, extending above the lid 15 approximately one inch, and being rounded on their tops.

The learning cards 12 are constructed of rigid material, such as plastic, wood, or paper board, and are fabricated with the dimensions of approximately 8 inches long by 3 inches wide, and are provided with two round holes 20 which are cut through near the bottom and top of the learning cards 12 for fitting over the rounded pegs 19 and, being of slightly larger diameter than the outside diameter of the rounded pegs 19, with the centers of the holes 20 being spaced equally distant as the distance between the center points of the parallel rows of the rounded pegs 19. Each learning card 12 is provided with a letter, number, or symbol 21 which is centered on the learning card 12 and which is embossed or raised a given distance or height 22 therefrom. Each of the learning cards 12 are provided in contrasting and different colors, depending upon the particular letter, number, or symbol 21 which is provided thereon.

The stimulus cards 13 are also constructed of rigid plastic, wood, or paper material and are of the same size and configuration as the learning cards 12. The stimulus cards 13 are preferably printed in two colors, such as black and white, and consist of a top side 23 and a bottom 24. On the top side 23 of a stimulus card 13 is provided in printed form the appearance of a series of learning cards 12 to form a given instruction, such as a word or mathematical formula, with the letters or numbers provided in a skewed or disparate position as shown in FIG. 3, indicating the specific letters or integers to be selected from the total batch of learning cards 12. On the bottom side 24 of the stimulus card 13, the learning cards 12 are depicted in their proper position when they would be placed on the rounded pegs 19 of the lid 15 of the storage and carrying case 11, as shown in FIG. 4.

When illustrating written letters 21, the trailing edge 25 of each letter is slanted upwardly at a 45 degree angle to match the leading edge 26 of subsequent letters to provide a continuous format of written letters.

In practice, the tactile learning device can be used for the instruction of retarded children or to expedite the learning retentiveness of more advanced children. The student first activates the instructional tape cassette player which provides vocal instruction supported by comments, questions, and stimulating comments designed to interestingly lead the child in a programmed method of advancing from easier to more progressive or harder lessons. Since such programmed learning tapes are common in the educational field, they are not described as part of this invention but are merely mentioned as an alternative complement to the invention. Based upon the story-form instructions on the cassette tape, the learning child chooses and examines a stimulus card 13, chooses the corresponding learning cards 12 from the storage and carrying case 11, lays out the learning cards 12 on the knobby surface of the carrying case 11, and checks the results by turning over the stimulus card 13 to check the answer on the bottom side 24 of the stimulus card 13. The answer is checked both visually and tactilely by touchingly tracing with the fingers over the letters, numbers, or symbols 21 on their raised heights 22, thereby enforcing the educational procedure in the child by the combinational use of the child's visual and touch senses. In this way, the child gradually progresses from easier printed or written words to more difficult words, the same procedure being applicable to mathematical formulae, equations, etc., depending upon the advancement of the particular child.

There is thus provided a tactile learning device for use by retarded children or children with advanced capabilities to expedite their learning ability by combining the basic elements of visual and tactile perception, this being accomplished by assisting the child in determining the position of spacial elements, by enhancing perception of spacial relationships, by developing perceptual consistency through repeated exercises, and by reinforcing the visual-motor and figure-ground coordination.

It is to be understood that the form of this invention as shown and described is to be taken as a preferred example thereof, and that this invention is not to be limited to the exact arrangement of parts described in the description or illustrated in the drawings as changes thereto in the details thereof pertaining to size, shape and arrangement of parts thereof are envisioned within the scope of the invention without departing from the novel concepts of the invention.

Having thus described the invention, what is claimed is:

1. A tactile learning device for the programmed education of children, particularly retarded or more advanced children, in primary skills, including printing, writing, and mathematics, the device comprising in combination:

a conventional tape cassette player to provide audio instructions to a child;

a conventional storage and carrying case with compartments built therein for holding learning and stimulus cards, with the carrying case being provided with a series of pegs on the outside of the lid thereof for the attachment of learning cards thereto;

a series of learning cards with raised letters, numbers or symbols provided in contrasting colors so as to provide both visual and tactile perception of a word or formula to be learned, said learning cards having holes therein to match the pegs on the outside of the lid of the case to permit a correct arrangement of letters, numbers or symbols in forming a continuous word or formula;

and a series of stimulus cards with a given word, formula, etc. being imprinted in skewed fashion on one side thereof to show the letters, numbers or symbols required to form a given word or formula, with the answer on the reverse side of the stimulus card being provided with the proper arrangement of the letters, numbers or symbols to match the proper arrangement of the learning cards when affixed to the top of the lid of said storage and carrying case;

said learning cards constructed of rigid material, such as plastic, wood, or thick paper, with dimensions of approximately 8 inches long by 3 inches wide to provide easily seen and manually handled learning cards for instructional purposes.

* * * * *